Sept. 15, 1931.　　　F. M. ROEHL ET AL　　　1,823,409
DOUGHNUT MACHINE
Filed Oct. 31, 1928　　　3 Sheets-Sheet 1

Inventor
Frank M. Roehl
and
Peter J. Toews
By
Bradbury & Cauwell
Attorneys

Sept. 15, 1931.   F. M. ROEHL ET AL   1,823,409
DOUGHNUT MACHINE
Filed Oct. 31, 1928   3 Sheets-Sheet 2

Inventor
Frank M. Roehl
and
Peter J. Toews
By
Bradbury & Caswell
Attorneys

Sept. 15, 1931.  F. M. ROEHL ET AL  1,823,409
DOUGHNUT MACHINE
Filed Oct. 31, 1928  3 Sheets-Sheet 3

Inventor
Frank M. Roehl
and
Peter J. Toews
By Bradbury + Caswell
Attorneys

Patented Sept. 15, 1931

1,823,409

UNITED STATES PATENT OFFICE

FRANK M. ROEHL AND PETER J. TOEWS, OF MINNEAPOLIS, MINNESOTA, ASSIGNORS TO NATIONAL AUTOMATIC DOUGHNUT MACHINE COMPANY, OF MINNEAPOLIS, MINNESOTA, A CORPORATION OF MINNESOTA

DOUGHNUT MACHINE

Application filed October 31, 1928. Serial No. 316,144.

Our invention relates to doughnut machines and particularly to machines for continuously frying doughnuts.

An object of the invention resides in providing an elongated tank together with a doughnut forming device situated at one end thereof, adapted to discharge doughnuts in said tank, to further provide said tank with a relatively deepened portion immediately below said forming means.

Another object of the invention resides in providing a conveyor for moving the doughnuts along the deepened portion of said tank, said conveyor being submerged within the cooking medium and extending below the forming means.

A still further object of the invention resides in utilizing said conveyor for circulating the cooking medium within the deepened portion of the tank independent of the cooking medium in the shallow portion thereof to bring the heated cooking medium at the head of the tank and to move the doughnuts from the head of the tank and toward the tail thereof.

A still further object of the invention resides in providing a second conveyor for moving the doughnuts along the shallow portion of the tank and for agitating the cooking medium, the major portion of said second conveyor extending above the tank proper, said conveyor cooperating with said first named conveyor to continuously move the doughnuts along said tank.

A feature of the invention resides in forming said first named conveyor with a series of perforate paddles for moving the doughnuts, the perforations in said paddles causing the doughnuts to readily leave said conveyor and to be picked up by the second conveyor.

Another object of the invention resides in interposing between said paddles a series of perforate plates serving to limit the downward movement in the cooking medium of the doughnut discharged by the forming means.

Other objects of the invention reside in the details of construction and in the novel combination and arrangement of parts described in the following specification and shown in the drawings.

Figure 1:
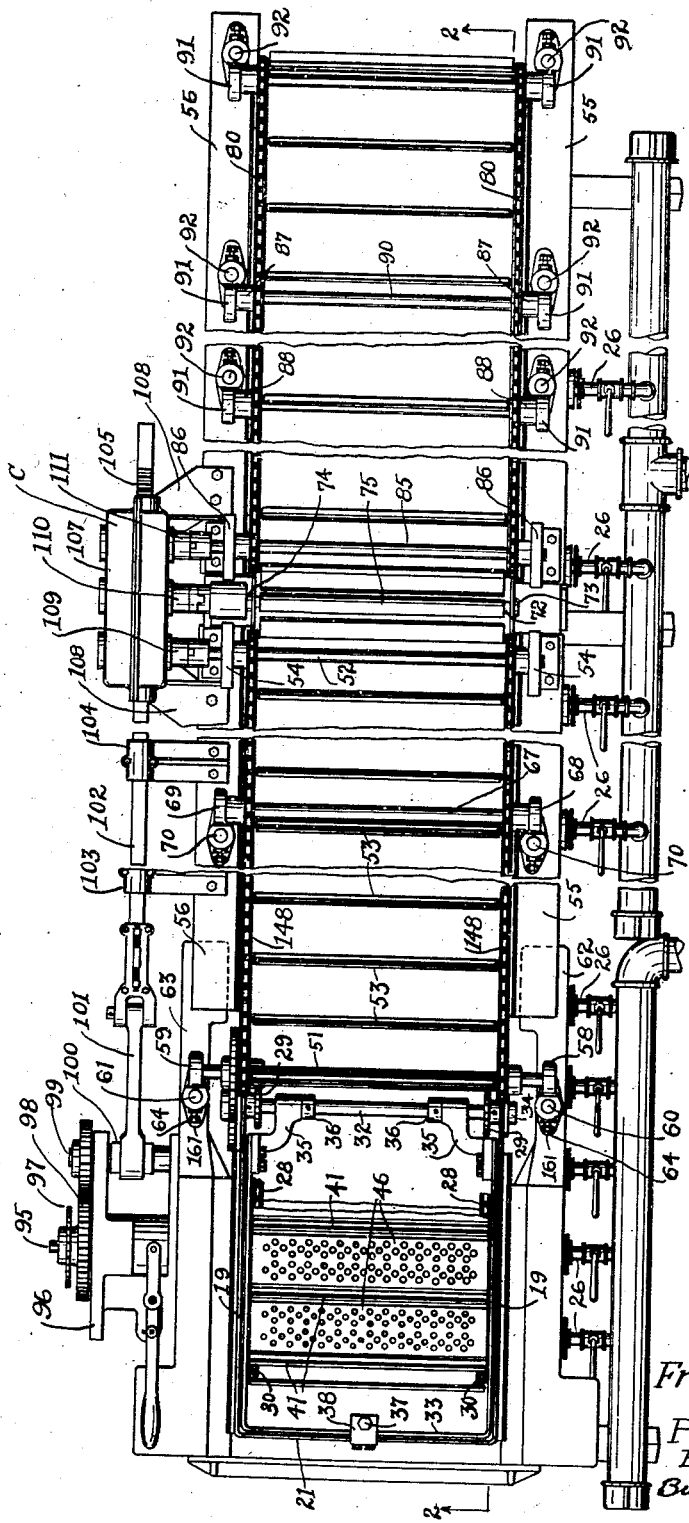
Fig. 1 is a plan view of a doughnut machine illustrating an embodiment of my invention with portions thereof broken away to show the construction of same.

The doughnut machine illustrated in the drawings comprises primarily a device indicated in its entirety at A for forming the raw doughnuts into desired form, a frying device indicated at B for frying the same, and a transmission device indicated at C for operating the frying device. The present invention relates primarily to the frying device B, and the former A and transmission C have hence not been shown in detail, other applications covering these separate inventions being filed herewith.

Figure 2:
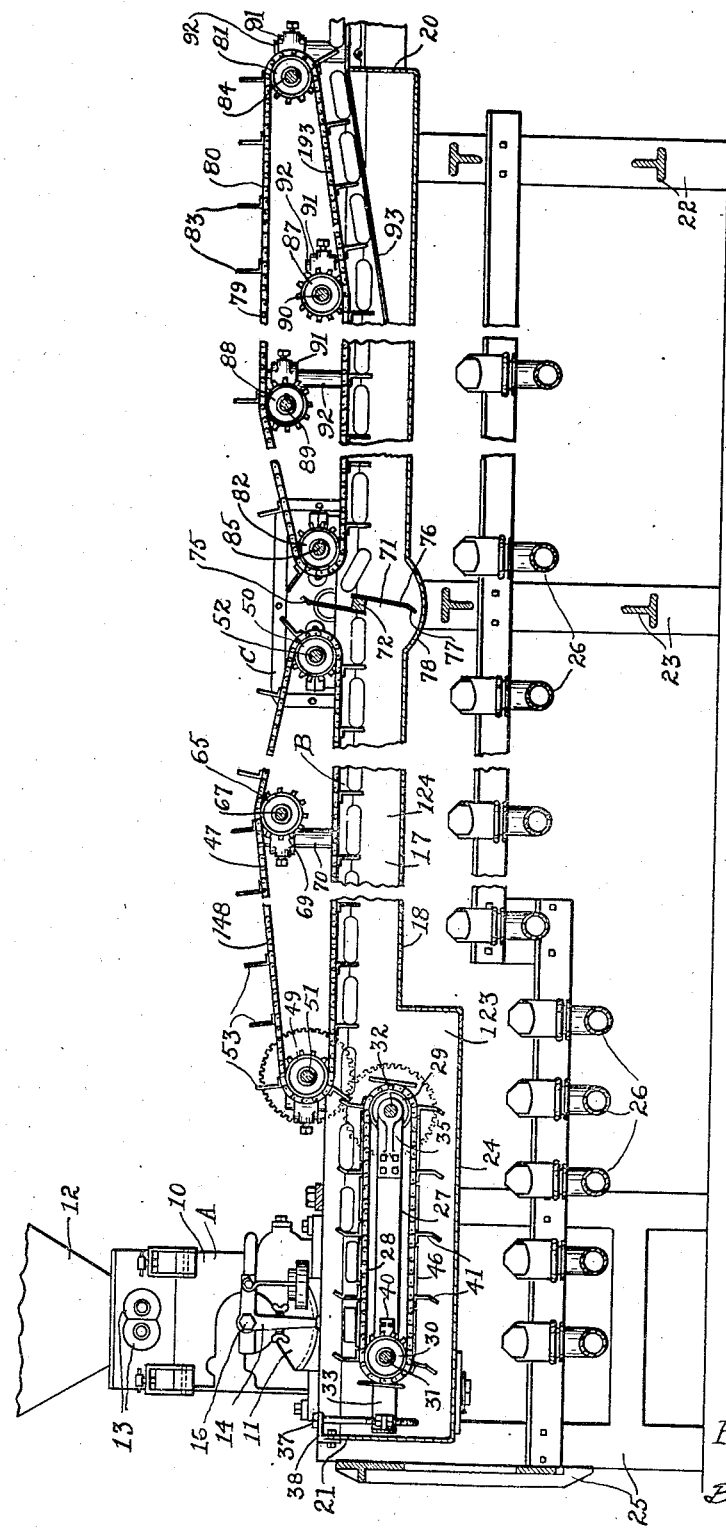
Fig. 2 is a longitudinal elevational sectional view taken on line 2—2 of Fig. 1.
Figure 3:
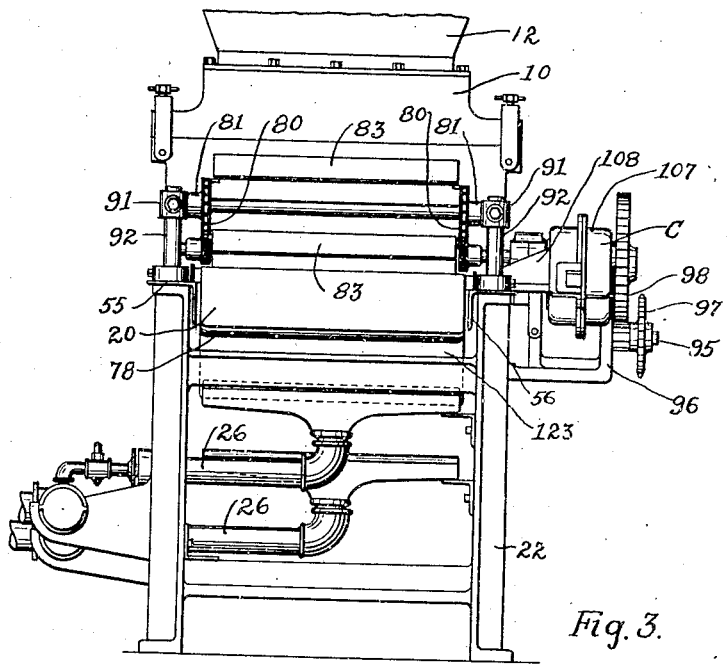
Fig. 3 is an end elevational view of the structure shown in Figs. 1 and 2 viewed from the discharge end of the machine.

The doughnut former which we desire to use with our invention is shown in Fig. 2 and comprises a casing 10 in which is mounted for rotation a drum 11. The drum 11 may be constructed with suitable pockets in the form of a doughnut into which the raw dough contained in a hopper 12 may be fed. The hopper 12 is situated on top of the case 10 and the dough therefrom is forced into the pockets in the drum 11 by means of a gear type feeding device 13. The formed doughnuts are ejected from the pockets in the drum 11 by any suitable means and the same stripped from the drum 11 by means of a stripper 14 operated through a weight 15 and actuated by the shaft 16 supporting drum 11. Although we have specified this particular type of doughnut former, yet it can be readily understood that any other type that will discharge the formed raw doughnut in a downward direction may also be used in place thereof.

The invention proper consists of an elongated tank 17 provided with a bottom 18, side walls 19, and end walls 20 and 21. This tank is supported upon a frame work comprising transverse frame sections 22, 23, and 25 which are connected together by means of a number of longitudinal angle beams 55 and 56 which together with the said frame sections support the other structure forming a part of the invention. At the head end of the machine, a portion 24 of the bottom 18 of tank 17 is dropped considerably below the major portion of the bottom thereof to divide the tank into a relatively deepened portion 23 at the head of the tank and a relatively shallow portion 24 communicating with said deepened portion and extending throughout the remainder of the tank. The tank is filled to within a short distance of the open top thereof with a suitable cooking medium such as a deep fat which is maintained at a suitable temperature by means of a series of gas burners 26 which are mounted below the bottom 18—24, or the said tank may be maintained at the proper temperature by any other suitable means.

The doughnut former A is disposed at the head end of the machine adjacent the end wall 21 and immediately above the deepened portion 23 of the tank and is arranged to discharge the formed doughnuts at the head end of this portion of the tank into the cooking medium within the same. Within the deepened portion 23 of tank 17 is disposed a conveyor indicated in its entirety at 27 which is submerged in the cooking medium within said tank. This conveyor comprises two chains 28 which pass over sprocket wheels 29 and 30 attached to two transverse shafts 31 and 32. The shaft 32 is journaled in bearings 34 attached to the side walls 19 of tank 17. A U shaped frame structure 33 disposed within the deepened portion 23 of tank 17 terminates in brackets 35 which are journaled upon the shaft 32 and which are held from end wise movement thereon through collars 36. By means of this construction, the frame 33 is pivotally mounted on the shaft 32, the forward end thereof being vertically adjustable through a bolt 37 supported by a lug 38 on the end wall 21 of tank 17 and engaging a threaded member 39 attached to the said frame structure 33.

The shaft 31 carrying the sprockets 30 is journaled in suitable bearings 40 mounted on the frame 33 so that when the said frame is oscillated upon the shaft 32 through the action of the bolt 37, the forward end of the said conveyor may be raised or lowered, as desired.

Figure 4:
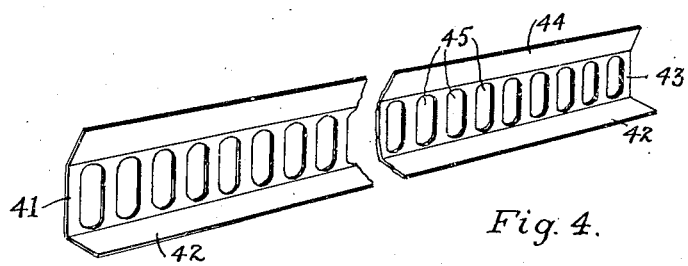
Fig. 4 is a perspective view on a larger scale of one of the paddles used with the invention.
Figure 5:
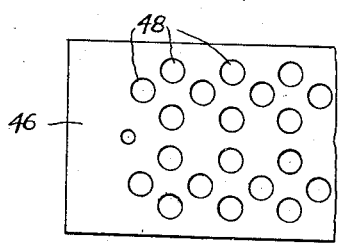
Fig. 5 is a plan view on a larger scale of one of the perforate plates used in conjunction with the paddles.

The conveyor 27 further comprises a series of paddles 41 which we have illustrated in detail in Fig. 4. These paddles are constructed with base portions 42 adapted to extend across the respective chains 28 and to be secured therethrough to corresponding links of said chains. The said paddles further include upstanding portions 43 which terminate in forwardly bent marginal portions 44. Portions 43 are preferably constructed with a series of elongated perforations 45 which assist in the movement of the doughnuts through the cooking medium in a manner to be presently described. Interposed between the paddles 41 are a number of plate like members 46 which are attached medially of the longitudinal edges thereof to the center links between the respective paddles. These plates are formed with a series of perforations 48 which facilitate the movement of the same through the cooking medium as the conveyor 27 operates. These plates serve to limit the downward movement of the doughnut when the same is discharged from the former A into the cooking medium. By providing the perforations within the plate 46, the doughnuts descend in an easy and natural manner to the bottom of said plates where they remain until the same have been partially fried. After sufficient frying the doughnuts rise to the surface of the cooking medium where the same are carried along by means of the various paddles 41. The former A and the conveyor 27 are so timed that the said former deposits the raw doughnuts between the respective paddles 41 as said paddles pass beneath the discharge portion of said former so that one set of doughnuts is deposited in each of the compartments formed by said paddles and the plates 46.

In the operation of the device, the doughnuts are carried along the upper portion of the forward part of the tank 17 by means of the upper run of the conveyor 27. At the same time the upper strata of the cooking medium is simultaneously moved along the tank, though due to the perforations 45 in paddles 41 at a slow rate of speed. Concurrently therewith, the lower strata of the cooking medium is moved along the deepened portion 23 of tank 17 in the opposite direction. This has the effect of circulating the cooking medium within this portion of the tank and of bringing the heated cooking medium from the bottom of the tank toward the forward end of the tank where the same may be immediately utilized to receive the freshly formed raw doughnut and fry the same. It may be here stated that by immersing the conveyor 27 within the cooking medium that the said conveyor is caused to form a double function, namely that of moving the doughnuts along the tank and of simultaneously circulating the cooking medium. By deepening the portion of the tank immediately below the forming device, a large body of the cooking medium is at all times available to receive the freshly formed doughnut. It has been found that considerably more heat is required when the doughnut is first immersed in the heating medium than after same has been partially fried. This substantial volume of cooking medium hence serves to supply the necessary heat and further assists in maintaining the temperature of the cooking medium more nearly constant.

For conveying the partially fried doughnuts further along tank 17, we employ a second conveyor indicated in its entirety at 47. This conveyor is similarly constructed to the conveyor 27 and is provided with two chains 148 which pass over sprockets 49 and 50 mounted on shafts 51 and 52. The chains 148 carry paddles 53 similar to the paddles 41 but in connection therewith the plates 46 utilized with conveyor 27 have been omitted. The entire conveyor 47 is so disposed that the paddles 53 thereof on the lower run of said conveyor depend into the cooking medium in a manner to cooperate with the paddles 41 of conveyor 27 so as to move the doughnuts continuously along the tank 17. With this conveyor the shafts 51 and 52 and the supporting structure therefore are disposed entirely above the tank proper where the same may be readily inspected and adjusted at will. The shaft 52 is journaled in bearings 54 attached to the longitudinal frame members 55 and 56. Shaft 51 is journaled in bearings 58 and 59 which are mounted for vertical adjustment on upstanding posts 60 and 61 carried by base members 161 attached to brackets 62 and 63 cast on and extending outwardly from the frame member 25. The bearings 58 and 59 are held in adjusted position on the posts 60 and 61 through set screws 64 whereby the relation of the forward end of conveyor 47 may be independently adjusted to cause the paddles 53 to cooperate with the paddles 41 of conveyor 27. For tightening the chains 148 we employ a chain tightener comprising two sprockets 65 carried on a shaft 67 which is journaled in bearings 68 and 69 similar to the bearings 58 and 59. These bearings are adjustably mounted on posts 70 the same as the posts 61 so that the sprockets 65 may be raised and lowered to take up the slack in the two chains 148.

In the middle of the shallow portion 24 of tank 17, we provide a turnover device indicated in its entirety at 71 which serves to turn the doughnuts over in the machine so that the same may be fried on both sides thereof. This turnover device consists of a shaft 72 journaled in bearings 73 and 74 attached to the sides 19 of the pan 17. This shaft is squared along the center of the same as best shown in Fig. 2 and has attached to it two oppositely extending plates 75 and 76, the extreme marginal portions 77 of which are slightly bent to readily engage the doughnut as the shaft 72 is rotated. The plates 75 and 76 are timed to cooperate with the paddles 53 of conveyor 47 and serve to pick up the doughnut in front of the last paddle on said conveyor and to turn said doughnut over and deposit it in the cooking medium on the other side of shaft 72. The plates 75 and 76 just clear the shaft 52, and the bottom of the tank indicated at 78 is depressed to permit of the movement of the end of said plates in close proximity to the bottom of the tank. The plates 75 and 76 are preferably perforated to permit of the ready movement of the same through the cooking medium. By means of this construction, the turning over of the doughnuts is accomplished in a positive and effective manner.

For the purpose of moving the doughnuts along the remainder of the tank 17, we employ a third conveyor 79 which is substantially identical with the conveyor 47. This latter conveyor comprises chains 80 carried by sprocket wheels 81 and 82 which chains have attached to them paddles 83 identical with the paddles 53. Sprockets 81 and 82 are mounted on shafts 84 and 85 of which the shaft 85 is journaled in bearings 86 attached to the frame members 55 and 56. In addition to the sprockets 81 and 82 two additional sets of sprockets 87 and 88 are employed which serve to guide the conveyor in the desired manner to elevate the doughnuts above the end 20 of the tank. The sprockets 88 are mounted upon a shaft 89 while the sprockets 87 are mounted upon a shaft 90. Shafts 84, 89 and 90 are all journaled in adjustable bearings 91 which are mounted on posts 92 attached to the longitudinal frame members 55 and 56. The shaft 90 is preferably disposed at the same elevation as the shaft 85 while the shaft 84 is considerably elevated to cause the tail end of the lower run 93 of conveyor 79 to incline upwardly so as to allow the paddles 83 to clear the upper edge of the end wall 20 of tank 17. Within the end of this tank is disposed a series of bars 93 which extend from the upper edge of the said end wall 20 and downwardly into the cooking medium along an inclined surface situated in close proximity to the end of the various paddles on the run 193 of conveyor 79. These paddles, in conjunction with the said bars, serve to elevate the doughnuts from the cooking medium and to deposit the same upon an apron 94 from which the finished doughnuts may be removed in any desired manner. The sprockets 88, similar to the sprockets 82, serve as tighteners for the conveyor while the sprockets 87 and 81 give the desired direction to the lower run 93 thereof.

The driving of the various conveyors and the doughnut former may be accomplished in any suitable manner, though we prefer to have the conveyors driven in a step by step fashion so that the conveyors remain stationary while the doughnuts are fed upon the same and turned over. For this purpose we have shown in the drawings a drive shaft 95 which is journaled in suitable bearings formed in a frame structure 96 attached to the frame members 24 and 25. This shaft is adapted to be driven from any suitable force of power through a sprocket wheel 97 and is adapted to drive through a system of gearing 98 a counter shaft 99. Shaft 99 is journaled similar to shaft 95 and is formed with a crank portion 100 which has connected to it a connecting rod 101. This connecting rod serves to reciprocate a longitudinally disposed bar 102 slidable along guideways 103 and 104 attached to the longitudinal frame member 56. The bar 102 is formed with a rack 105 on the end thereof which passes through a transmission case 107 attached to the frame structure of the machine through a pair of brackets 108. The transmission within said case includes three rotary parts 109, 110 and 111 which are adapted to be coupled with the shafts 52, 72 and 85. The translatory movement of the rack 105 is adapted to impart to each of these shafts an intermittant partial rotational movement whereby the paddles 53 and 83 or conveyors 47 and 79 are given a step by step movement for a distance equal to the space between the same. For every unitary movement of these paddles, the shaft 72 is given a half turn which causes the same to function in a manner to turn over the doughnuts delivered by the conveyor 47 and to discharge the same in a position to be picked up and carried on by the conveyor 79. The transmission within the case 107 operates in a manner to hold the shaft 72 from movement while the two conveyors 47 and 79 are being advanced and to hold the said conveyors from movement while the turnover device 71 is being operated.

Conveyor 27 is driven from conveyor 47 by means of two intermeshing spur gears 112 and 113 which are mounted upon the shafts 32 and 51 respectively. The paddles 53 and 41 of these conveyors are so timed that the former picks up the doughnuts as the same reach the end of the conveyor 27 so as to continue the movement of the doughnuts along the tank 17.

The former A may be driven from the shaft 95 in any suitable manner such that a series of doughnuts are discharged from the same every time the conveyors move a distance equal to the length between the various paddles. The particular gearing for driving the former A and the transmission for operating the shafts 52, 72 and 85 not forming a part of this invention have not been shown in detail in this application, though it can readily be comprehended that any suitable type of driving means and any type of transmission providing the desired functions may readily be employed.

In the use of the invention, the tank 17 is filled with a suitable cooking medium which will become liquid upon heating. A sufficient quantity of such cooking medium is employed to float the doughnuts at about the elevation indicated in Fig. 2 whereby the same may be readily engaged by the various paddles of the conveyors and the turnover device. By adjusting the U frame 33, the receiving end of the conveyor 27 may be raised or lowered at will to control the depth of the plates 46 below the level of the cooking medium. Likewise, the end of the conveyors 47 and 79 may be elevated and lowered to cause the paddles thereof to enter the cooking medium the required amount so as to cause the same to properly function in the moving of the doughnuts along the tank.

Our invention is highly advantageous in that the doughnuts are properly fried and all of the doughnuts leaving the machine are uniform in size, color and form. By deepening the tank at the receiving end of the same, sufficient hot cooking medium is always available for the initial frying of the doughnuts so that all of the doughnuts rise to the surface quickly and after the same lapse of time. All of the parts are so timed and interconnected that an absolutely positive operation of the machine is insured whereby control of the doughnuts is at no time lost. Due to this fact, waste is practically entirely eliminated. By submerging the first conveyor in the deepened portion of the tank, the same is entirely out of the way and in a position to readily receive the formed raw doughnuts without interference with the operating mechanism of the former.

Changes in the specific form of our invention, as herein disclosed, may be made within the scope of what is claimed without departing from the spirit of our invention.

Having described our invention, what we claim as new and desire to protect by Letters Patent is:

1. A doughnut machine comprising a tank, two conveyors for moving the doughnuts along said tank, a turn-over paddle disposed between said conveyors, said paddle including a shaft and a pair of oppositely directed paddle members secured to said shaft in offset relation to one another to form rests on opposite sides of said shaft.

2. A doughnut machine comprising a tank, two conveyors for moving the doughnuts along said tank, a turn-over paddle disposed between said conveyors said paddle including a shaft, a pair of paddle members secured to said shaft on opposite sides thereof for engaging the doughnuts, said shaft forming a rest for the edge of the doughnut for supporting the same during the over-turning thereof.

3. A doughnut machine comprising a tank for the reception of a cooking medium, means situated at one end of the tank for forming raw doughnuts, a submerged conveyer disposed within said tank below said forming means, paddles formed on said conveyer for moving the doughnuts along said tank, a second conveyer disposed without said tank, said second conveyer having paddles extending into the cooking medium for further engaging the doughnuts and conveying them along said tank, the paddles of said second named conveyer intermeshing with the paddles of said first conveyer, said conveyers being timed to cause uniform movement of both sets of paddles to cause the continuous conveying of the doughnuts along the tank.

4. A doughnut machine comprising a tank, a conveyer positioned above said tank, engaging members depending from said conveyer and into said tank, and a number of inclined fingers extending over the end of said tank and cooperating with said engaging members for raising the doughnuts over the end of said tank.

In testimony whereof we have affixed our signatures to this specification.

FRANK M. ROEHL.
PETER J. TOEWS.